(12) United States Patent
Thompson et al.

(10) Patent No.: US 7,530,737 B2
(45) Date of Patent: May 12, 2009

(54) SYSTEM AND METHOD FOR MEASURING TEMPERATURE USING ELECTROMAGNETIC TRANSMISSIONS WITHIN A WELL

(75) Inventors: M. Clark Thompson, Los Alamos, NM (US); David W. Beck, Santa Fe, NM (US); Don M. Coates, Santa Fe, NM (US)

(73) Assignee: Chevron U.S.A. Inc., San Ramon, CA (US)

( * ) Notice: Subject to any disclaimer, the term of this patent is extended or adjusted under 35 U.S.C. 154(b) by 175 days.

(21) Appl. No.: 11/802,036

(22) Filed: May 18, 2007

(65) Prior Publication Data
US 2008/0285619 A1 Nov. 20, 2008

(51) Int. Cl.
G01K 13/00 (2006.01)
(52) U.S. Cl. .................................. 374/136; 340/854.3
(58) Field of Classification Search ................. 374/136; 340/854.3, 854.6
See application file for complete search history.

(56) References Cited

U.S. PATENT DOCUMENTS

| | | | | |
|---|---|---|---|---|
| 3,562,741 A | | 2/1971 | McEvoy et al. | |
| 4,023,136 A | * | 5/1977 | Lamensdorf et al. | 340/854.3 |
| 4,160,970 A | * | 7/1979 | Nicolson | 340/854.6 |
| 4,430,577 A | | 2/1984 | Bouquet | |
| 4,845,378 A | | 7/1989 | Garbe et al. | |
| 5,150,067 A | | 9/1992 | McMillan | |
| 6,434,372 B1 | | 8/2002 | Neagley et al. | |
| 6,766,141 B1 | | 7/2004 | Briles et al. | |
| 6,993,432 B2 | * | 1/2006 | Jenkins et al. | 702/13 |
| 7,017,662 B2 | * | 3/2006 | Schultz et al. | 166/254.2 |
| 7,180,826 B2 | * | 2/2007 | Kusko et al. | 367/85 |
| 7,397,388 B2 | * | 7/2008 | Huang et al. | 340/853.3 |

* cited by examiner

*Primary Examiner*—Andre J Allen
(74) *Attorney, Agent, or Firm*—Crowell & Moring LLP (57) ABSTRACT

Exemplary systems and methods are directed to measuring temperature in a borehole located below a surface of a landform using high-energy transmission. A sequence of electromagnetic (EM) energy pulses are generated from a signal generator located at the surface of the landform. The energy pulses are reflected at a ring frequency by one or more downhole transducers. The reflected energy pulses are received at a receiver, which is located at the surface, during a predetermined time interval. The receiver detects the received energy pulses through a time domain or frequency domain technique. Each detected ring frequency is correlated to an inductance of the associated downhole transducer. The inductance is correlated to a temperature of the borehole.

15 Claims, 12 Drawing Sheets

SYSTEM AND METHOD FOR MEASURING TEMPERATURE USING ELECTROMAGNETIC TRANSMISSIONS WITHIN A WELL

BACKGROUND

Field

Methods and systems are disclosed for measuring temperature using electromagnetic-based communication within a well.

U.S. Pat. No. 6,766,141 (Briles et al.) discloses a system for remote downhole well telemetry. Telemetry communication is used for monitoring oil well conditions and recording instruments which are located in a vicinity of a bottom of a gas or oil recovery pipe.

As described in U.S. Pat. No. 6,766,141, known telemetry systems include a radio frequency (RF) generator/receiver base station that communicates electrically with conductive piping located in a (well) borehole. The RF frequency is characterized as being electromagnetic radiation between 3 Hz and 30 GHz. A downhole electronics module having a reflecting antenna receives a radiated carrier signal from the RF generator/receiver. The radiated carrier signal is then modulated and reflected, the modulation being responsive to downhole measurements performed by the electronics module. The reflected, modulated signal is transmitted by the pipe to the surface of the well where it can be detected by the RF generator/receiver. The detected signal is analyzed to determine drilling conditions within the borehole.

To address signal strength limitations inherent to the above described methods, Applicants have developed telemetry systems and methods that utilize electromagnetic (EM) pulses rather than radio waves. Such systems and methods rely on one or more downhole transducers that interact with at least some of the EM energy of the pulse at a resonant "ring frequency" so as to reflect some of said EM energy back to the surface. The downhole transducer(s) comprising an inductive element and a capacitive element, wherein the capacitive element is responsive to changes in temperature. See U.S. patent application Ser. No. 11/394,186, filed Mar. 31, 2006.

Notwithstanding the benefits of Applicants' aforementioned system and methods, Applicants have sought to simplify such system and methods by simplifying the selection and role of the capacitive element contained therein.

BRIEF DESCRIPTION OF THE INVENTION

In view of the aforementioned state of the prior art, the present invention provides a simpler method and system of sensing temperature in a borehole based on an inductive characteristic of a transducer that is used to return electromagnetic (EM) pulsed energy back to the surface (from which it originated). In such systems and methods, the transducer comprises an inductive element and a capacitive element, and the temperature-dependent inductive drift of ferrite rings (the inductive component of the downhole/borehole transducer) can be determined from the resonant frequency of said transducer. Accordingly, this drift can be correlated with temperature. Additionally, the temperature measurement is not dependent on changes in the capacitance of the capacitive element-thereby simplifying selection of the capacitors used in said transducers.

In some embodiments, the present invention is directed to a method for measuring temperature in a borehole established below a surface of a landform. The method includes directing electromagnetic energy, as EM pulse(s), into the borehole to excite at least one downhole transducer that reflects the EM energy at a ring frequency determined by an inductance of the transducer, wherein the transducer comprises a temperature-sensitive inductive element and a temperature-insensitive (or at least temperature-independent) capacitive element. The reflected energy is received at a receiver located at the surface of the landform during a predetermined time interval. The method further includes processing the received energy using one of time domain tracking, a frequency domain tracking, or combination thereof, to determine a temperature in the borehole based on the inductance of the transducer.

In accordance with some embodiments, the present invention is directed to a system for measuring temperature in a borehole established below a surface of a landform, and based on electromagnetic energy pulse(s) reflected at a resonant frequency from at least one downhole transducer to the surface of the landform, wherein the transducer comprises a temperature-sensitive inductive element and a temperature-insensitive capacitive element. The system comprises means for receiving the reflected energy pulse at the surface during a predetermined time interval; and a means for processing the received energy to extract the resonant frequency using one of time domain tracking, a frequency domain tracking, or combination thereof, and determine a temperature in the borehole based on an inductive element of the downhole transducer, which is correlated to the extracted frequency.

In other embodiments, the present invention is directed to apparatus(es) for measuring temperature in a well established in a landform, wherein the well includes a resonant cavity for resonating electromagnetic energy pulses transmitted into the well, and a transducer that reflects the electromagnetic energy pulses to a surface of the well at the resonant frequency, wherein the transducer comprises a temperature-sensitive inductive element and a temperature-insensitive capacitive element. The apparatus comprises means for receiving the energy pulses reflected from the transducer. The apparatus also comprises means for processing the received energy using one of time domain tracking, frequency domain tracking, or a combination thereof to extract the resonant frequency of the transducer and determine a temperature in the well based on an inductance of the transducer, the inductance being correlated to the extracted resonant frequency.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

Other advantages and features described herein will be more readily apparent to those skilled in the art when reading the following detailed description in connection with the accompanying drawings, wherein.

DETAILED DESCRIPTION OF THE INVENTION

As mentioned above, the present invention utilizes an electromagnetic (EM) pulse to wirelessly interrogate one or more transducers (sensors) in a downhole environment, such as a borehole, for the purpose of determining temperature. An EM pulse is a broadband, high-intensity, short-duration burst of electromagnetic energy. See FED-STD-1037C, "Telecommunications: Glossary of Telecommunication Terms," GSA, Aug. 7, 1996. Such EM pulses differ markedly from the radiofrequency (RF) signals used in Briles et al., U.S. Pat. No. 6,766,141.

FIG. 1 shows an exemplary apparatus 100 for interrogating a downhole environment, in accordance with some embodiments of the present invention. Apparatus 100 is more fully described below.

Figure 1A:
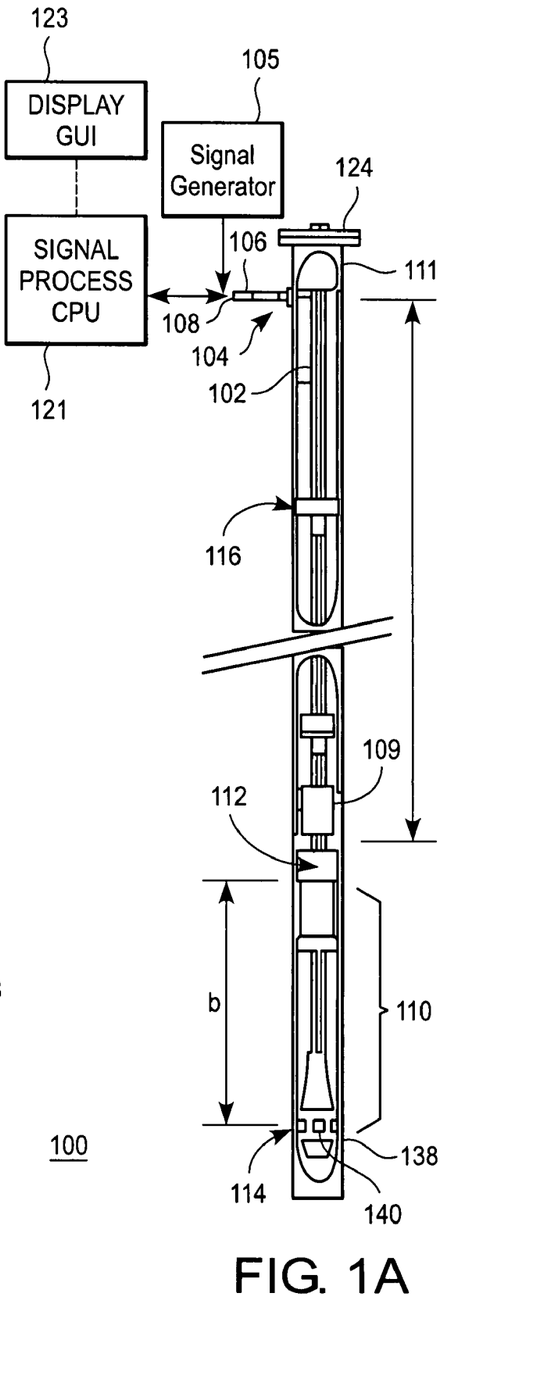
FIGS. 1A-1D show an exemplary embodiment of an apparatus for sensing a characteristic of a borehole.

As referenced herein, a downhole environment can be an area within or below the surface of a landform that includes a borehole and the area surrounding a borehole through which electromagnetic energy can be communicated. The borehole can be a cavity that can be located within or beneath a landform, and which can be characterized by various orientations, material compositions, temperature, pressure, flow rate, or other measurable parameter(s)—all of which can vary along its length. The electromagnetic energy can be processed to measure desired characteristics of the downhole environment. The apparatus 100 mentioned above includes means, such as a conductive pipe 102, for conducting a pulse through the borehole to interrogate the borehole and/or downhole environment. As referenced herein, interrogating can include transmitting electromagnetic energy into a borehole, receiving a reflected energy pulse from electronic components in the borehole, and processing the reflected energy pulse to extract information related to characteristics of the borehole and/or downhole environment. A borehole characteristic of particular interest is temperature.

An inlet 104, coupled (e.g., connected) to the conductive pipe 102, is provided for applying electromagnetic energy to the conductive pipe 102. In an exemplary embodiment, the electromagnetic energy can be of any desired frequency selected, for example, as a function of characteristics to be measured within the borehole and as a function of the length and size of the downhole environment.

The inlet 104 includes a probe 106 coupled with the conductive pipe 102. The probe 106 can be formed, for example, as a coaxial connector having a first (e.g., interior) conductor coupled electrically to the conductive pipe 102, and having a second (e.g., exterior) conductive casing coupled to a hollow borehole casing 111. An insulator is used to separate the interior conductor from the exterior conductive casing.

The inlet 104 can include an inductive isolator, such as a ferrite inductor 108 or other inductor or component, for electrically isolating the inlet 104 from a first potential (e.g., a potential, such as a common ground, of the return current path of the borehole casing 111 ) at a location in a vicinity of the inlet 104. The apparatus 100 can include means, such as a signal generator 105, coupled to the inlet 104 for generating the electromagnetic energy to be applied to the conductive pipe 102.

The hollow borehole casing 111 can be placed into the borehole whose characteristics are to be monitored. The hollow borehole casing 111 can, for example, be configured of steel or other suitable material.

The conductive pipe 102 can be located within, and electrically isolated from, the hollow borehole casing 111 using spacers 116. The spacers 116, for example, can be configured as insulated centralizers which maintain a separation distance of the conductive pipe 102 from the inner walls of the hollow borehole casing 111. These insulating spacers 116 can be configured as disks formed from any suitable material including, but not limited to nylon.

The apparatus 100 includes means, such as a resonant network device 110 responsive to the pulse, for resonating at a frequency which is modulated as a function of a characteristic of the borehole. The resonant network device 110 can be, for example, any electro-acoustic or other device including, but not limited to any magnetically-coupled electrically-resonant mechanical structure for performing an electrical resonance, such as the resonant cavity of FIG. 2A, the tank circuit of FIG. 2B, or any other suitable device. The resonant network device can be connected with or mechanically coupled to the conductive pipe. A torroidal core of the resonant network device can be magnetically coupled to the conductive pipe. The torroidal core is a magnetic core formed as a medium by which a magnetic field can be contained and/or enhanced. For example, the resonant network device can be a single turn coil with a one inch cross-section wrapped around a ferrite core, or any other suitable device of any suitable shape, size and configuration can be used.

Those skilled in the art will appreciate that a magnetic core is a material significantly affected by a magnetic field in its region, due to the orientable dipoles within its molecular structure. Such a material can confine and/or intensify an applied magnetic field due to its low magnetic reluctance. The wellhead ferrite inductance 108 can provide a compact inductive impedance in a range of, for example, 90-110 ohms, or lesser or greater as desired, reactive between an inlet feed point on the pipe and a wellhead flange short. This impedance, in parallel with an exemplary 47 ohm ($\Omega$) characteristic impedance of the pipe-casing transmission line can reduce the transmitted and received signals by, for example, about ~3 dbV at the inlet feed point for a typical band center at 50 MHz. The magnetic permeability of the ferrite cores can range from ~20 to slightly over 100μ (Henries/m), or lesser or greater. As such, for a given inductance of an air-core inductor, when the core material is inserted, the natural inductance can be multiplied by about these same factors. Selected core materials can be used for the frequency range of, for example, 10-100 MHz, or lesser or greater.

The resonant network device 110 illustrated in FIG. 1 will be described as the resonant cavity, in the context of FIG. 2A. However, the tank core of FIG. 2B can be readily substituted, as can any other suitable resonant network device known to those skilled in the art. Referring to FIG. 1, the resonant cavity is electrically connected to the conductive pipe, and is located within the hollow borehole casing 111. A length "b" of the resonant cavity within the hollow borehole casing is defined by an inductive isolator formed, for example, as a torroidal core 112 at a first end of the resonant cavity, and by a connection 114 at a first potential (e.g., common ground) at a second end of the resonant cavity. The resonant network device 110 receives energy from the pulse, and "rings" at its natural frequency.

A means for sensing can include a transducer provided in operative communication with the resonant network device 110 and coupled (e.g., capacitively or magnetically coupled) with the first (e.g., common ground) potential. The transducer is configured to sense a characteristic associated with the borehole and to modulate the frequency induced in the resonant network device 111 when a pulse is applied to the inlet 104 of the probe 106. The modulated frequency can be processed to provide a measure of a particular borehole characteristic (e.g., temperature). That is, the frequency induced by the pulse is modulated by a sensed characteristic of the borehole, and this modulation of the frequency can be processed to provide a measure of the characteristic.

The sensing means can include, or be associated with, means for processing, represented as a processor (e.g., computer 121). The processing means can process an output of the resonant network device as transmitted via the borehole casing 111. The processor 121 can provide a signal representing the characteristic to be measured or monitored. In an exemplary embodiment, for example, the processor 121 can be configured to process the received signal using a time domain or a frequency domain tracking method. As referenced herein, sensing includes receiving a reflected energy pulse from a transducer located in the borehole and processing the reflected energy pulse to extract information related to the characteristics of the borehole or downhole environment.

In an exemplary embodiment, at least a portion of the hollow borehole casing 111 is at the first potential (e.g., common ground). For example, the hollow borehole casing 111 can be at a common ground potential at both a location in a vicinity of the inlet 104, and at a location in a vicinity of the resonant network device 110. The grounding of the hollow borehole casing 111 in a vicinity of the inlet 104 is optional, and establishes a known impedance for the conductive pipe 102. The grounding of the hollow borehole casing 111 in a vicinity of the resonant network device 110 allows the resonant length to be defined. That is, the resonant cavity has a length within the hollow borehole casing 111 defined by the distance between torroidal coil 112 and the ground connection at a second, lower end of the resonant cavity.

The transducer of the resonant network device 110 can be configured to include passive electrical components, such as inductors and/or capacitors, such that no downhole power is needed. During an assembly of the apparatus 100 as shown in FIG. 1, the conductive pipe can be assembled in sections, and a spacer 116 can be included at each joint between the various pipe sections to ensure that shorting of the casing does not occur. Prior to placing the conductive pipe 102 and the resonant network device 110 into a borehole, a transducer used for sensing the modulated vibration frequency can be calibrated using the graphical user interface (GUI) 123 and processor 121. Note that the downhole transducer typically is the resonant network device.

Details of the exemplary apparatus of FIG. 1A will be described further with respect to FIG. 1B, which shows an exemplary telemetry component of the exemplary apparatus of FIG. 1A.

Figure 1B:
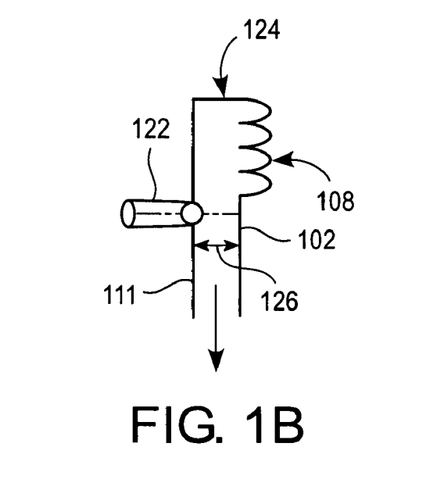

In FIG. 1B, the conductive pipe 102 and hollow borehole casing 111 are electrically isolated from one another via the ferrite inductance 108. Where the resonant network device is a natural resonator, the wavelength of the resonant "ring" frequency can dictate the size (e.g., length) of the device. Those skilled in the art will appreciate that the size constraint can be influenced (e.g., reduced) by "loading" the device with inductance and/or capacitance. For example, the amount of ferrite used in an exemplary embodiment can be selected as a function of desired frequency and size considerations.

An instrumentation signal port 122 is provided for receiving the probe 106. A wellhead configuration, as depicted in FIG. 1B, is normally short circuited to the hollow borehole casing 111. However, the ferrite inductor 108 alleviates this short circuit and thus isolates the conductive probe of the inlet 104, which is coupled with the conductive pipe 102, from the top of the wellhead which, in an exemplary embodiment, is at the common ground potential. In an exemplary embodiment, because the wellhead is grounded via short circuiting of the wellhead flange 124 to common ground, the ferrite inductor 108 isolates the short circuited wellhead flange from the conductive pipe 102 used to convey a pulse from the probe to the resonant cavity.

An exemplary impedance 126, between the conductive pipe 102 and the hollow borehole casing 111, can be on the order of 47 ohms, or lesser or greater. This portion of the conductive pipe 102 serves as a transmission line for communication of the downhole electronics, such as the transducer, with the surface electronics, such as the processor 121.

Figure 1C:
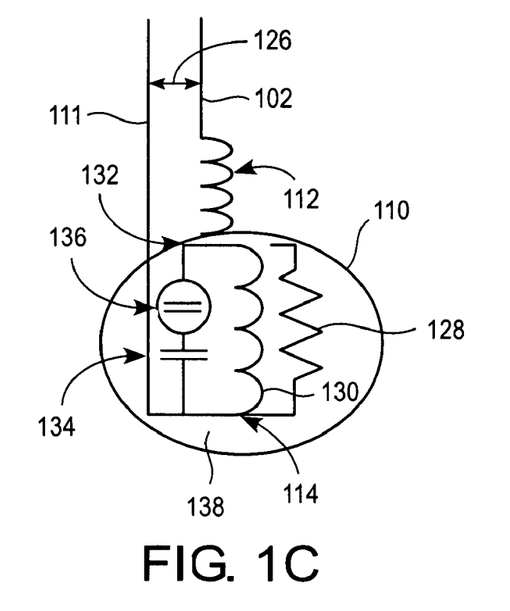

FIG. 1C illustrates an electrical representation of the resonant cavity and transducer included therein. In FIG. 1C, the torroidal core 112 is represented as an inductor section configured of ferrite material for connecting the conductive pipe 102 with the resonant cavity 110. As can be seen in FIG. 1C, for a resonant network device 110 configured as a resonant cavity, an upper portion 132 of the resonant cavity coincides with a lower section of the torroidal core 112 and can be at an impedance which, in an exemplary embodiment, is relatively high as compared to the impedance between conductive pipe 102 and the casing 111. For example, the impedance at the top of the resonant cavity can be on the order of 2000 ohms, or lesser or greater. For magnetic core-based, magnetically-coupled resonant networks, those measures may have little or no relevance.

This relatively large differential impedance at the top of the resonant cavity relative to the conductive pipe 102 above the resonant cavity provides, at least in part, an ability of the cavity to resonate, or "ring," in response to the pulse and thereby provide a high degree of sensitivity in measuring a characteristic of interest. In addition, the ability of the transducer to provide a relatively high degree of sensitivity is aided by placing a lower end of the resonant cavity at the common ground potential.

The FIG. 1C electrical representation of the resonant network device 110, for a coaxial cavity formed by the conductive pipe 102 and the borehole casing 111, includes a representation of the resonant network resistance 128 and the resonant network inductance 130. A lower portion of the cavity defined by the common ground connection 114 is illustrated in FIG. 1C, such that the cavity is defined by the bottom of the torroidal core 112 and the ground connection 114. A capacitance of the sleeve associated with the resonant cavity is represented as a sleeve capacitance 134.

The transducer associated with the resonant cavity for modulating the vibration frequency induced by the pulse, as acted upon by the characteristic to be measured, is represented as a transducer 136.

For a resonant cavity configuration, the bottom of the resonant cavity can include a Packer seal to connect the conductive pipe to the hollow borehole casing 111. The Packer 138, as illustrated in FIG. 1C and in FIG. 1A, includes exposed conductors 140 which can interface with conductive portions of the resonant cavity and the hollow borehole casing 111 to achieve the common ground connection 114 at a lower end of the resonant cavity.

Figure 1D:
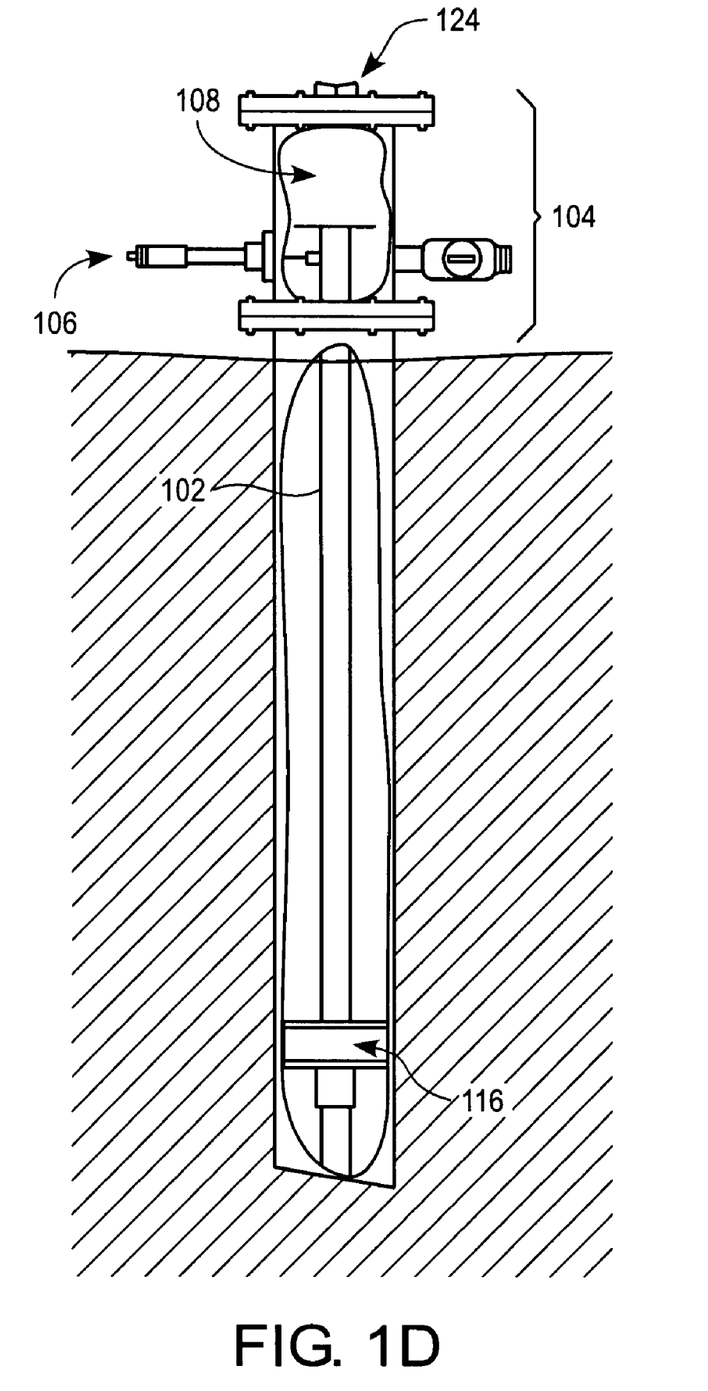

FIG. 1D illustrates another detail of the well telemetry component included at an upper end of the conductive pipe 102. In FIG. 1D, a connection of the probe 106 to the conductive pipe 102 is illustrated as passing through the hollow borehole casing 111, in the inlet 104. FIG. 1D shows that the probe 106 is isolated from the short-circuited wellhead flange 124 via the ferrite inductor 108.

Figure 2A:
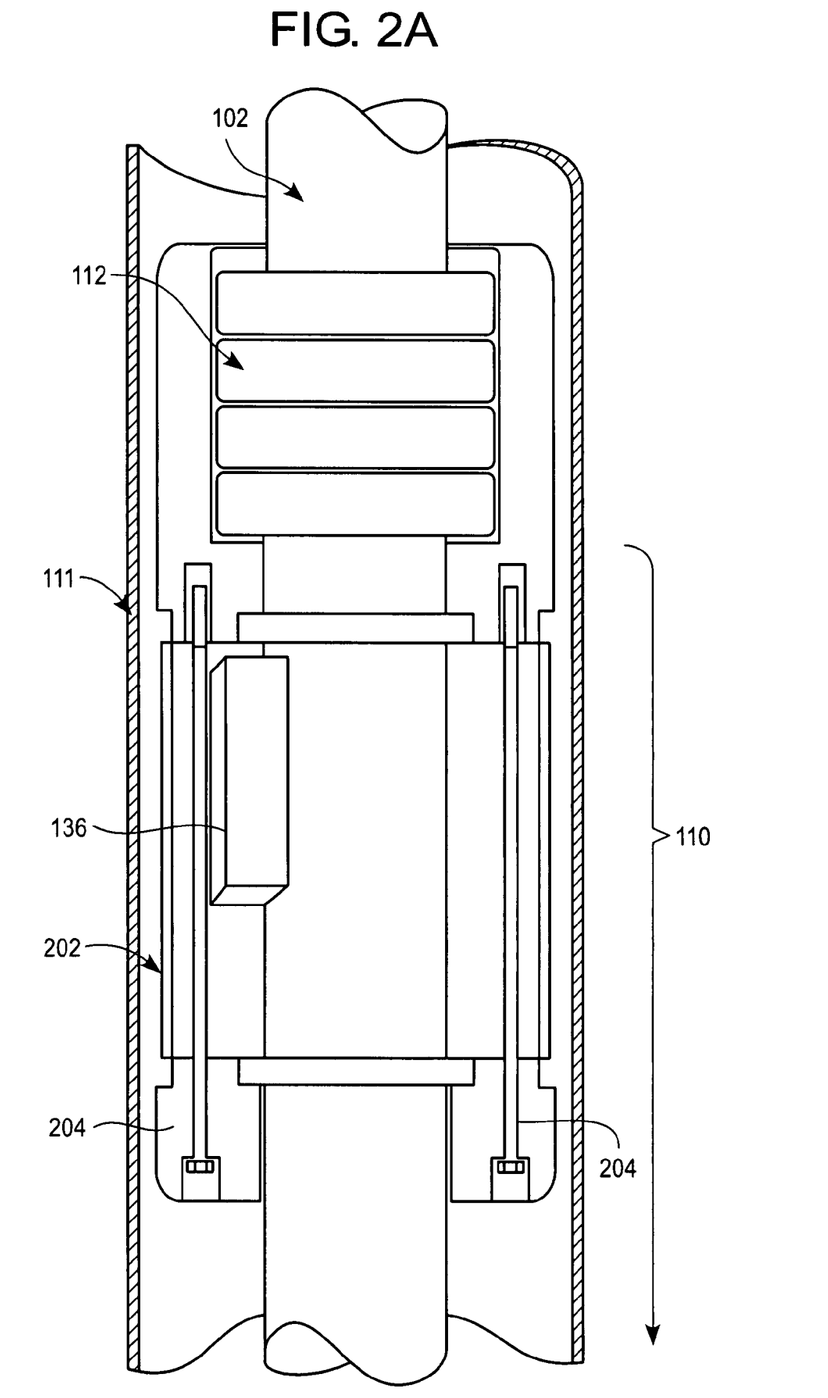
FIG. 2A shows an exemplary resonant cavity for use with the FIG. 1 apparatus.

FIG. 2A shows an exemplary detail of a resonant network device 110 formed as a resonant cavity. In FIG. 2A, the hollow borehole casing 111 can be seen to house the conductive pipe 102. The torroidal core 112 is illustrated, a bottom of which, in the direction going downward into the borehole, constitutes an upper end of the resonant cavity. The transducer 136 is illustrated as being located within a portion of the resonant cavity, and is associated with a conductive sensor sleeve 202, the capacitance of which is represented in FIG. 1C as the sleeve capacitance of the sleeve 134.

The ferrite torroidal core 112 can be configured as a torroidal core slipped into a plastic end piece. Such ferrite materials are readily available, such as cores available from Fair-Rite Incorporated, configured as a low μ, radio frequency-type material, or any other suitable material. Mounting screws 204 are illustrated, and can be used to maintain the sensor sleeve and transducer in place at a location along a length of the conductive pipe 102. A bottom of the resonant cavity, which coincides with a common ground connection of the Packer 138 to the hollow borehole casing, is not shown in FIG. 2.

Figure 2B:
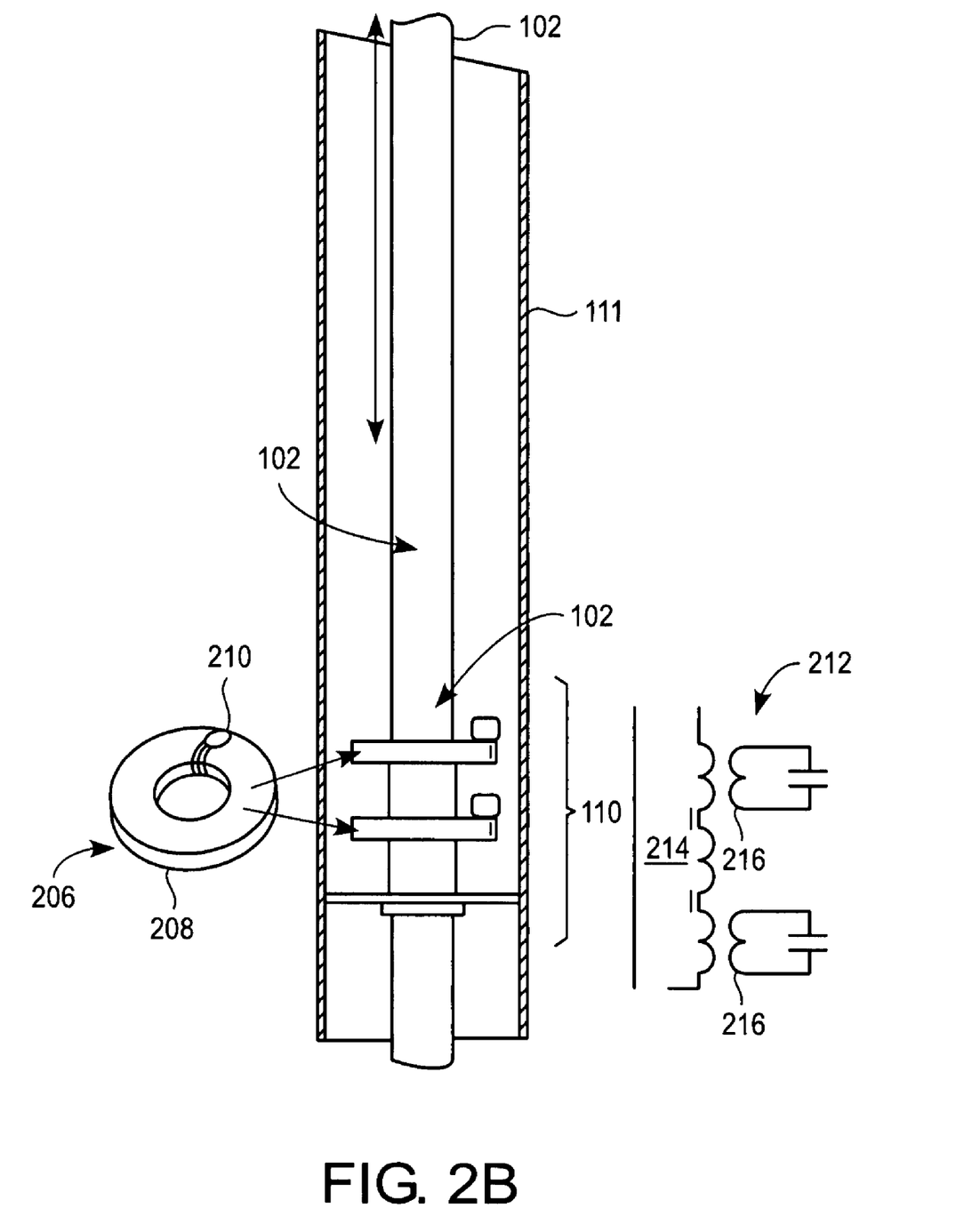
FIG. 2B shows an exemplary resonant network device formed as a magnetically coupled electrically resonant mechanical structure for performing electrical resonance.

FIG. 2B illustrates an exemplary detail of a resonant network formed as a tank circuit. In FIG. 2B, multiple resonant network devices 206 associated with multiple sensor packages can be included at or near the Packer 138 (See FIG. 1). In FIG. 2B, resonators using capacitive sensors and ferrite coupling transformers are provided. Again, the hollow borehole 111 can be seen to house the conductive pipe 102. Each resonant network device 206 is configured as a torroidal core 208 having an associated coil resonator 210. No significant impedance matching, or pipe-casing shorting modifications, to an existing well string need be implemented. The coaxial string structure can carry direct to a short at the Packer 138 using the ferrite torroid resonators, as illustrated in FIG. 2B, without a matching section as with the resonant cavity configuration.

In an electrical schematic representation, the conductive pipe 102 can be effectively represented as a single turn winding 214 in the transformer construct, and several secondary windings 216 can be stacked on the single primary current path. The quality of the Packer short is of little or no significance. Metal-toothed Packers can alternatively be used. The return signal using this transformer method can be detected, in exemplary embodiments, without using a low Packer shorting impedance.

In the exemplary FIG. 2B embodiment, spacing between multiple resonant network devices 206 can be selected as a function of the desired application. The multiple resonant network devices 206 can be separated sufficiently to mitigate or eliminate mechanical constraints. In addition, separation can be selected to mitigate or eliminate coupling between the devices 206.

In an exemplary embodiment, the distance of one width of a ring can decrease coupling for typical applications. The inductance and/or capacitance of each resonant network device can be modified by adding coil turns, and the number of turns can be selected as a function of the application. For example, the number of turns will set a ring frequency of each resonant network device. Exemplary embodiments can be on the order of 3 to 30 turns, or lesser or greater as desired.

In exemplary embodiments, the frequency used for the multiple resonant network devices 206 can be on the order of 3 MHz to 100 MHz or lesser or greater, as desired. The frequency can be selected as a function of the material characteristics of the conductive pipe 102 (e.g., steel or titanium). Skin depth can limit use of high frequencies above a certain point, and a lower end of the available frequency range can be selected as a function of the simplification of the resonant network device construction. However, if too low a frequency is selected, decoupling from the wellhead connection short should be considered.

In exemplary embodiments, when configured of a torroidal core 208, the resonant network device 206 can be used as a temperature sensor. For example, the inductance of ferrite magnetic materials can be subject to drift when exposed to certain temperatures. The sensitivity to certain temperatures that the torroidal core 208 can exhibit is determined by the formulation of the ferrite materials. The change in inductance of the torroidal core 208 effects the "ring" frequency of the resonant network device 206. A look-up table can be used to calibrate the inductance drift to specific values or ranges of temperature, as desired.

The resonant cavity can be configured to include multiple resonant network devices 206, where each resonant network device 206 can operate at a different "ring" frequency. Particularly, each resonant network device 206 can include a torroidal core having a different formulation of ferrite, which can result in varying sensitivities to temperature across the multiple resonant devices.

Thus, use of ferrite magnetic materials can simplify the downhole resonant network devices mechanically, and can allow fewer alterations to conventional well components. Use of a ferrite magnetic torroid can permit magnetic material to enhance the magnetic field, and thus the inductance, in the current path in very localized compact regions. Thus, stacking of multiple resonant network devices 206 at a remote site down the borehole can be achieved with minimal interaction among the multiple devices. The multiple sensor devices can be included to sense multiple characteristics and/or a single characteristic at varying depth. The use of a ferrite magnetic torroid can also be used to achieve relatively short isolation distances at the wellhead connection for coupling signal cables to the conductive pipe 102 as shown in FIG. 2C.

Figure 2C:
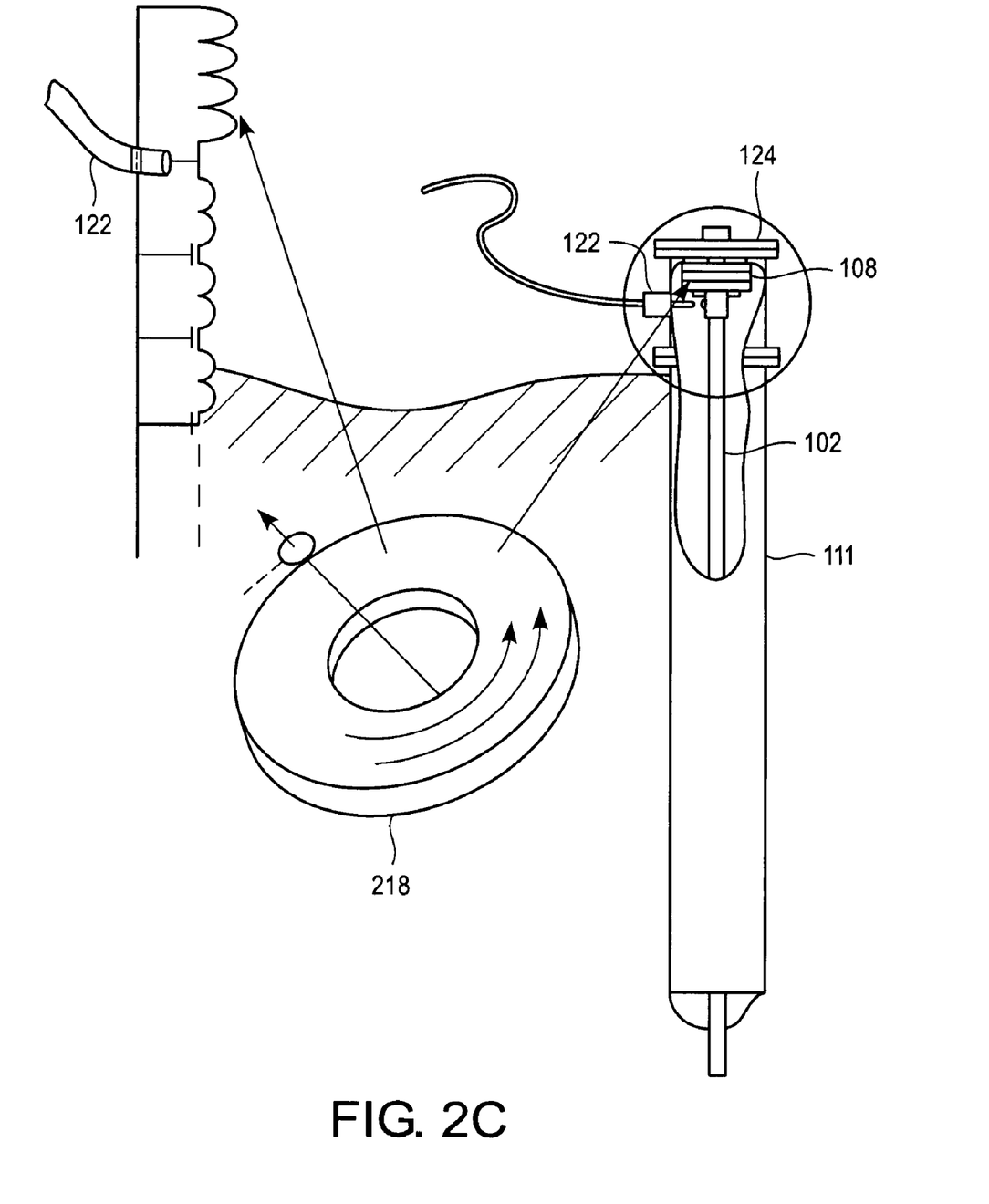
FIG. 2C illustrates an alternate exemplary wellhead connection.

FIG. 2C illustrates an exemplary alternate embodiment of a wellhead connection, wherein a spool 218 is provided in the wellhead flange 124 to accommodate the ferrite isolator and signal connections. An exemplary spool can, for example, be on the order of 8 to 12 inches tall, or any other suitable size to accommodate the specific application. The spool 218 is used for signal connection to the pipe string.

The resonant network device configured of a "torroidal spool" can be separated and operated substantially independent of sensor packages which are similarly configured and placed in a vicinity of the spool 218. An increased inductance in a width of the torroidal spool can be used to isolate the signal feed point at the wellhead connection. As is represented in FIG. 2C, current on the pipe surface will induce magnetic fields within the ferrite torroid for inductive enhancement of the pipe current path.

Figure 3:
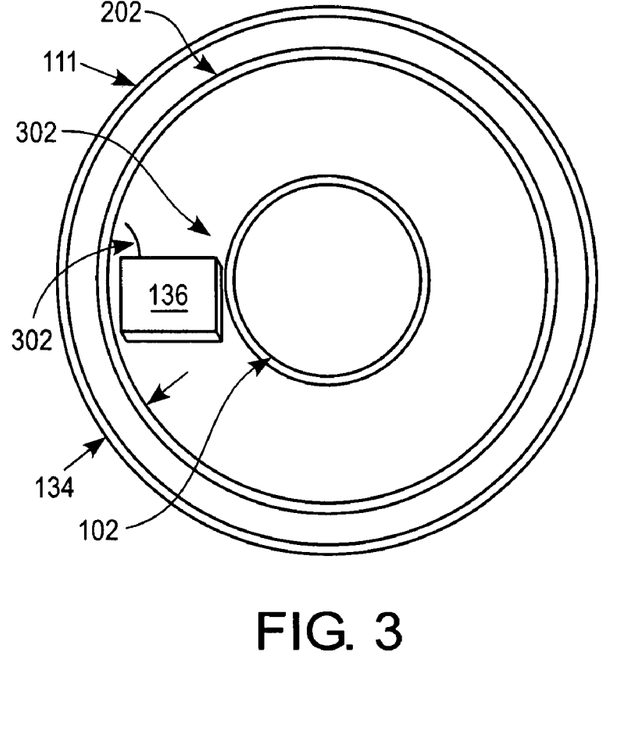
FIG. 3 shows a bottom view of the exemplary FIG. 2A resonant cavity.

FIG. 3 illustrates a view of the FIGS. 2A and 2B devices from a bottom of the borehole looking upward in FIG. 2. In FIG. 3, the transducer 136 can be seen to be connected via, for example, electrical wires 302 to both the sensor sleeve 202 and the conductive pipe 102. The sensor sleeve 202 in turn, is capacitively coupled to the hollow borehole casing 111 via the sleeve capacitance 134.

Figure 4:
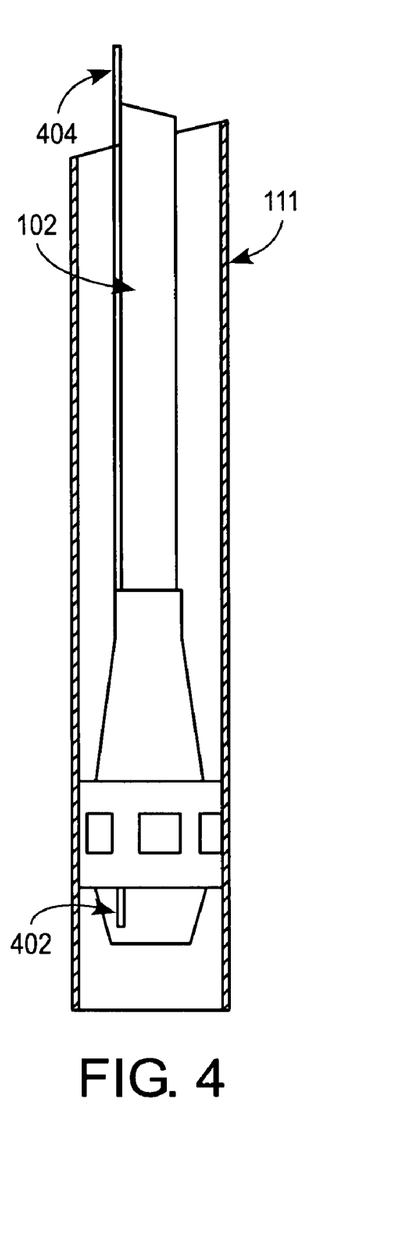
FIG. 4 shows an alternate exemplary embodiment of a resonant cavity wherein an exemplary mechanical or fluid feed to a transducer is located above a Packer seal.

FIG. 4 illustrates an alternate exemplary embodiment wherein the Packer 138 has been modified to include a conduit extension 402 into a zone of interest, which is deeper in the well than a position of the ferrite ring, where the characteristic of the borehole is to be measured. This extension 402 can, in an exemplary embodiment, be a direct port for sensing, for example, a pressure or temperature using an intermediate fluid to the sensor.

In exemplary embodiments, transducers, such as capacitive transducers, are mounted near the top of the resonant cavity as an electrical element of the sensor sleeve 202. Remote parameters can be brought to the sensor in the resonant cavity via a conduit that passes through and into a sealed sensing unit. The measurement of a desired parameter can then be remotely monitored. The monitoring can be extended using a mechanical mechanism from the sensor to relocate the sensor within the resonant cavity at different locations along the length of the conductive pipe 102. In FIG. 4, a sensor conduit 404 is provided to a pressure or temperature zone to be monitored.

The exemplary embodiments of apparatus 100, as shown for example in FIGS. 1-4, can be implemented in various downhole environments, e.g., locations below the surface of a landform, which includes but is not limited to slope landforms, coastal and oceanic landforms, fluvial landforms, and mountain and glacial landforms. Generally, the sending and receiving circuitry is provided at an above-surface location. In an off-shore or other water environment, the sending and receiving circuitry can be located on a platform or structure above the water surface. Coax cabling or other suitable conduit can be used to send and receive signals between the platform and conductive pipe 102, which is located on the ocean floor. Alternatively, in such off-shore environments, the sending and receiving circuitry can be located on the sea floor.

Figure 5:
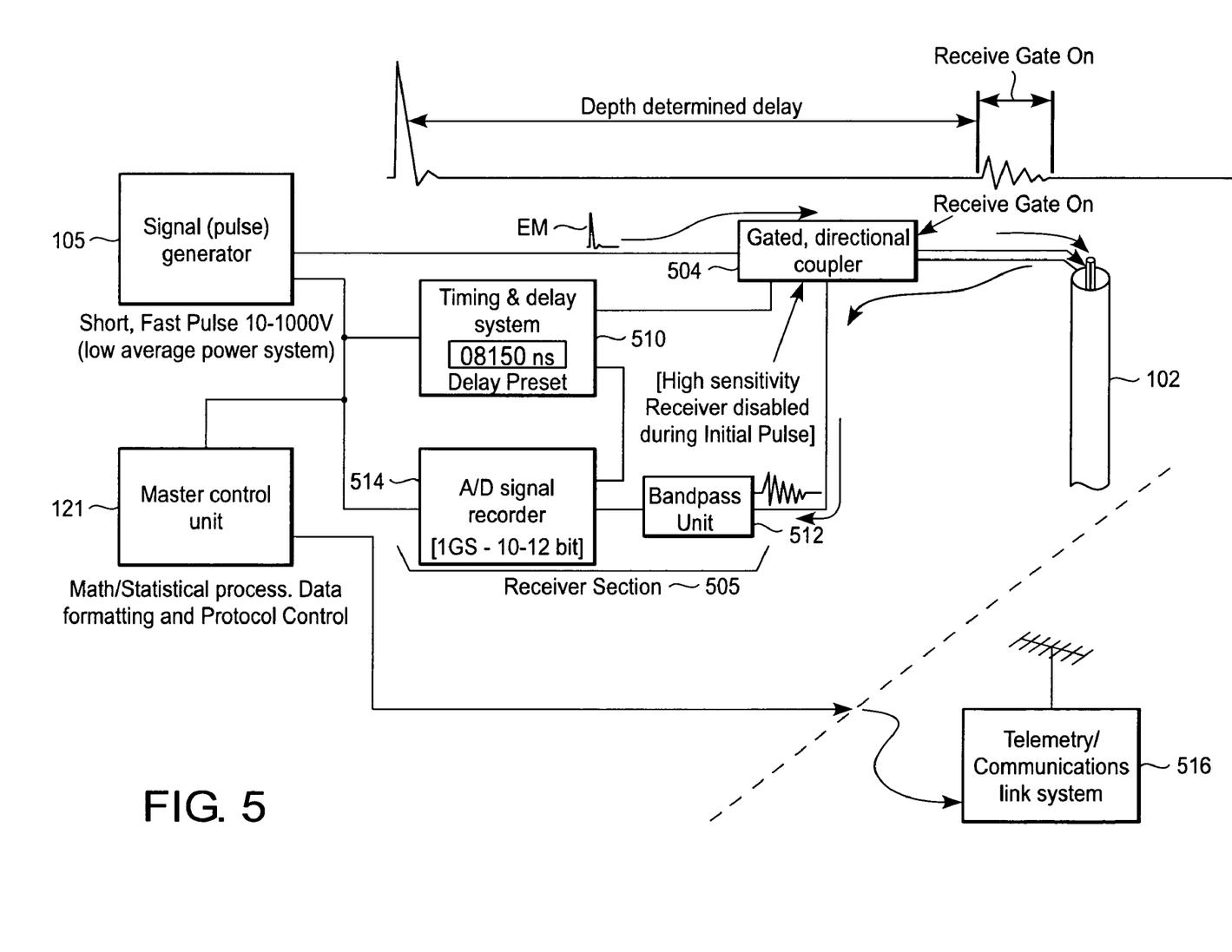
FIG. 5 shows an exemplary system for interrogating a downhole environment through a time domain tracking method.

FIG. 5 illustrates an exemplary system for interrogating a downhole environment through a time domain tracking method.

In FIG. 5, a pulse section representing the signal generator 105 of FIG. 1A is provided to transmit an exemplary impulse 502. This pulse is supplied to a gated, directional coupler 504 associated with the probe 106 of FIG. 1A. During an initial pulse, a high sensitivity receiver 505 associated with the signal processor 121 is disabled, and the pulse is applied to the conductive pipe 102.

The processor 121 controls the gated, directional coupler 504 to gate the receiver 505 on and thereby detect a return from the resonant network device 110 located in the resonant cavity. This return is generally depicted as the ringing frequency 508.

The ability of the receiver 505 to detect a reflected signal from the resonant network device 110 when the exemplary impulse 502 is transmitted by the above-surface signal generator 105, can be affected by the depth of the probe in the borehole (e.g., greater than 80 ft. or any other depth as desired) and by electronic noise generated in the borehole, both of which can result in a reduction in strength of the reflected signal.

To reduce these effects, the time domain tracking method technique establishes a specific time of pulse transmission and pulse return which allows precise control of the receiver gate sequence. A timing and delay system 510 can set a delay preset (e.g., 8150 nanoseconds as illustrated in FIG. 5) to control the gating of the receiver 505 for receipt of the feedback pulse. During the gating on of the receiver 505, the ping generated by the resonant network device 121 passes through the gated directional coupler 504 and through a band pass filter unit 512. A filtered signal from the band pass filter unit 512 is supplied to an analog-to-digital signal recorder 514 and into a master control unit (e.g., microprocessor, such as a Pentium, or other suitable microprocessor) of the processor 121. One skilled in the art will appreciate that any of the functionality illustrated in FIG. 5 can be implemented in hardware, software, firmware, or any suitable combination.

A telemetry/communication link system 516 can be provided to transmit information obtained from the borehole to any desired location. The telemetry/communication link system can be any suitable transmission and/or receiving system including, but not limited to, wireless and/or wired systems.

Figure 6A:
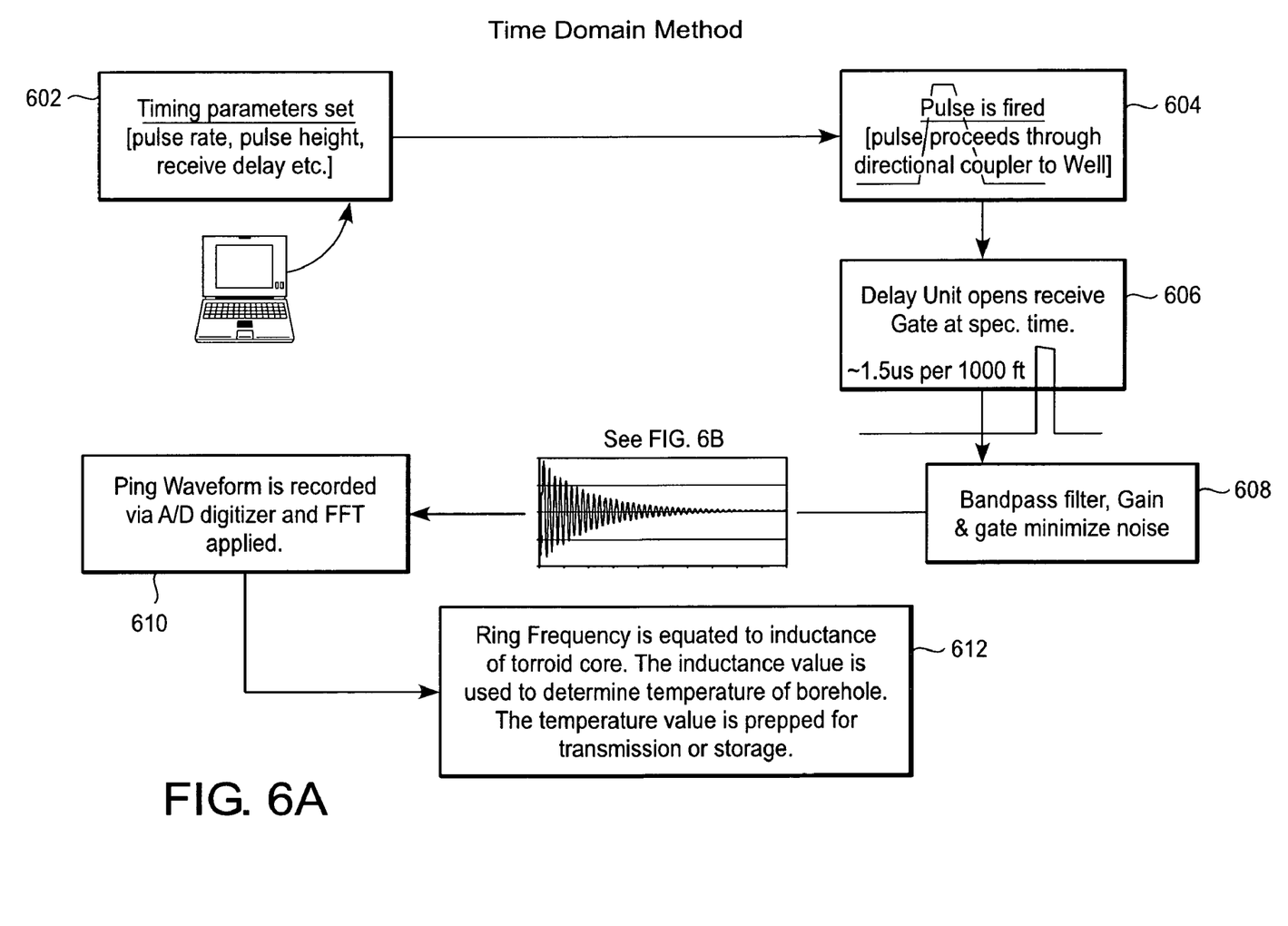
FIG. 6A shows an exemplary method for sensing a characteristic of a borehole using a time domain tracking method.

FIG. 6A shows an exemplary method for sensing a characteristic of a borehole using the time domain tracking method and, for example, an apparatus as described with respect to FIG. 5.

In FIG. 6A, at block 602, an operator can set timing parameters (e.g., via the general user interface). These parameters can include, without limitation, a pulse rate, a pulse height, a received delay, and so forth. In block 604, a pulse is supplied (e.g., fired) to the conductive pipe 102 via the directional coupler.

When detecting a reflective signal, after a specified delay, the timing and delay system 510 (see FIG. 5) opens a receiving gate to detect the modulated vibration frequency from the resonant network device 110 (Block 606). This modulated vibration frequency constitutes a ring which enters the band pass filter, and which is recorded by the analog-to-digital (A/D) converter 512 (Block 608).

In block 610, a digitized signature of the ringing signal can be processed for frequency, using, for example, a fast fourier transform (FFT). In block 612, the ring frequency can be equated, through software such as look-up tables contained within the processor 121, to a particular characteristic or LC filter parameter of the resonant network device 110, and then prepared for transmission or storage. For example, the frequency value can be used in a look-up table to obtain a value that represents an inductance of the torroid core 206 in the resonant network device 208. The inductance can be used as an address to another look-up table to determine a temperature or other measurable characteristic of the borehole. In exemplary embodiments, a temperature curve can be used to determine respective temperatures in the borehole based on the inductance of the torroid core 206. In some alternate embodiments, time domain tracking can be configured to detect more than one frequency at a time.

Figure 6B:
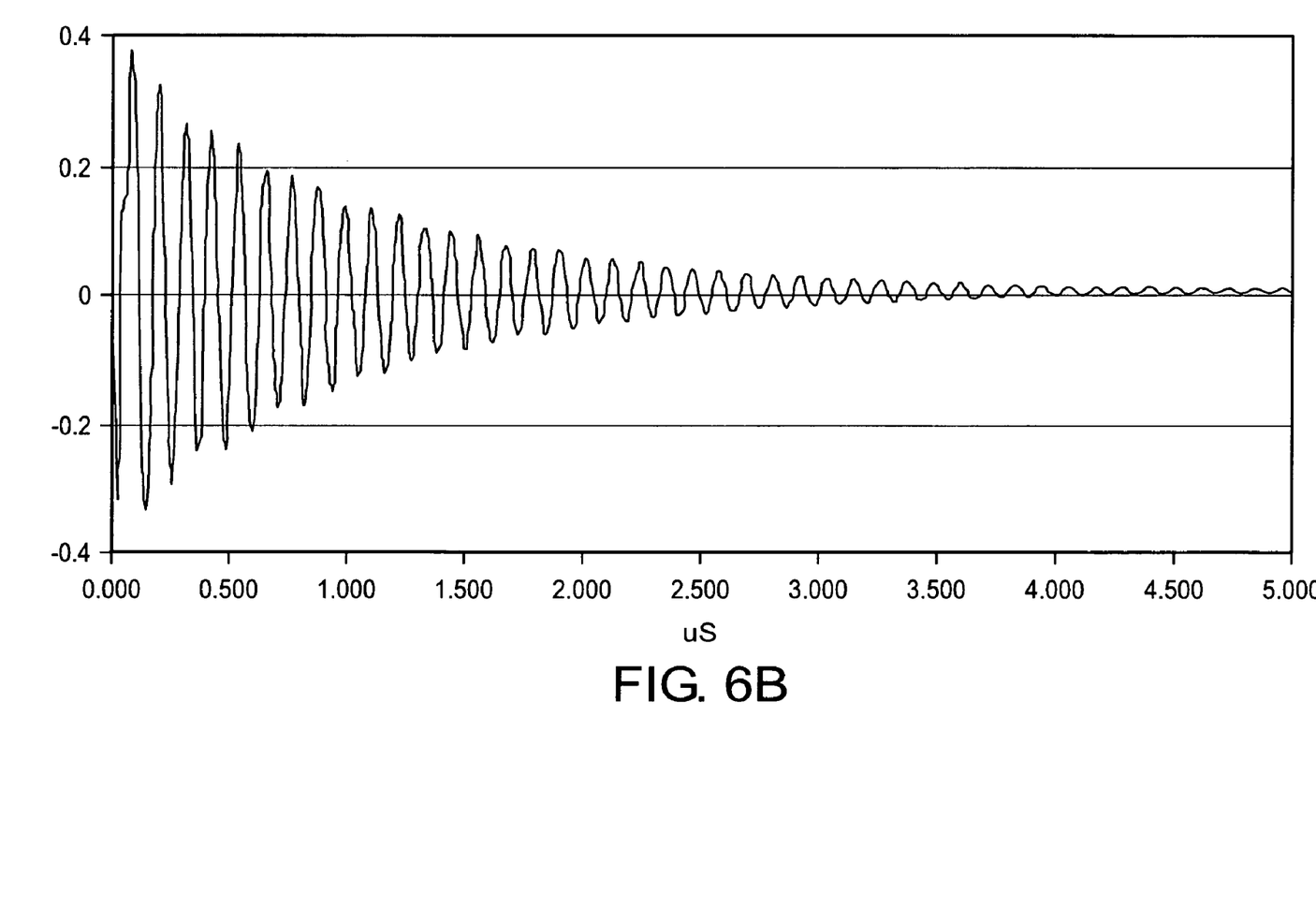
FIG. 6B shows an exemplary plot of a signal detected using the time domain tracking method.

FIG. 6B shows an exemplary plot of the detected reflective signal under the time domain tracking method.

Figure 7:
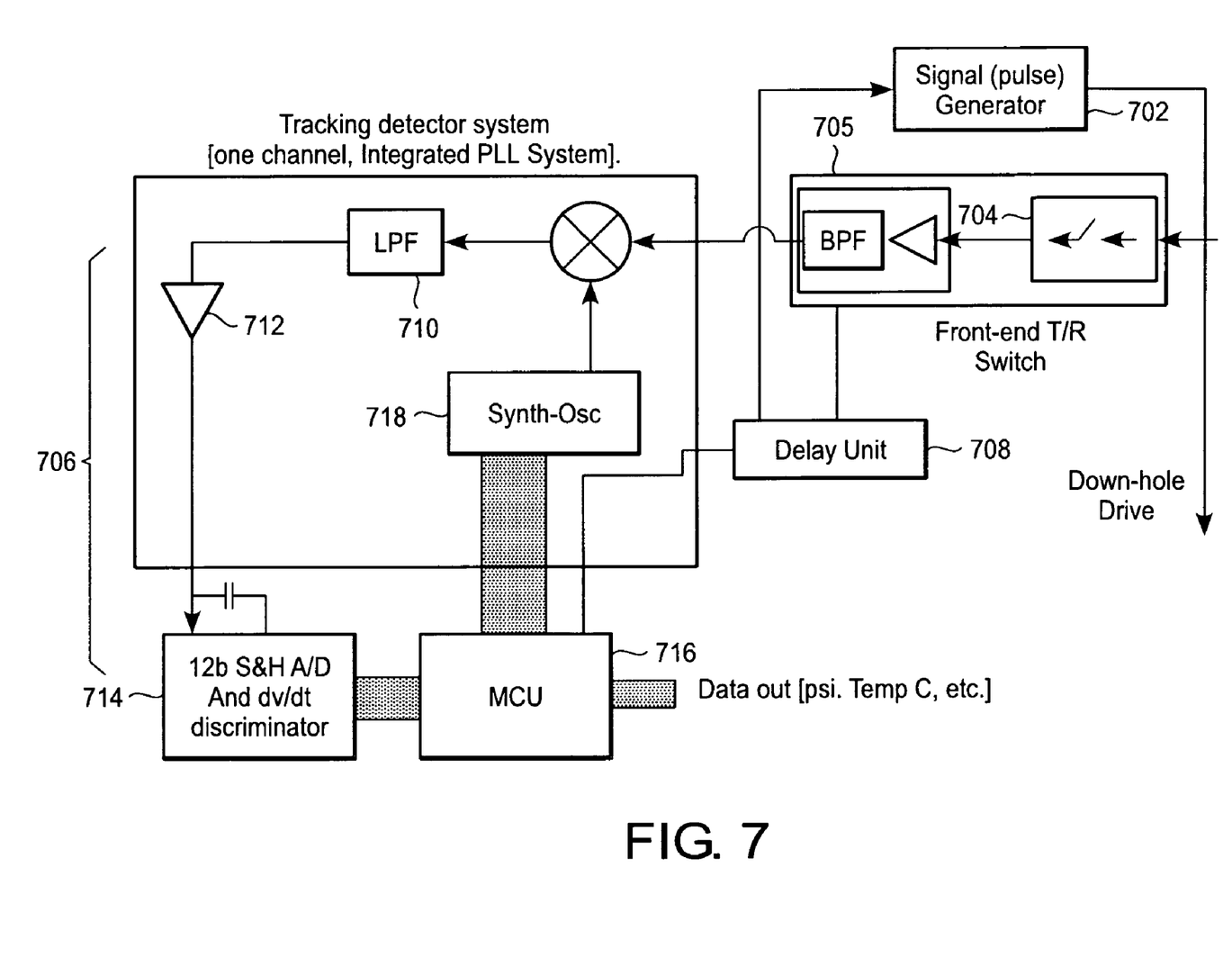
FIG. 7 shows an exemplary system for interrogating a downhole environment through a frequency domain tracking method.

FIG. 7 illustrates an exemplary system for interrogating a downhole environment through a frequency domain tracking method.

In FIG. 7, pulse generating means 702, such as signal generator 105 (FIG. 1A), generates an exemplary electromagnetic (EM) pulse. A gated directional coupler 704 is connected to receive the pulse, and during a transmit cycle, disable the receiver 706 so that the pulse can be applied to the conductive pipe 102. Non-nuclear means for generating EM pulses are well-known to those in the nuclear-weapons community. Such EM pulse generators are typically used to test electronic devices by simulating EM pulses associated with nuclear blasts. See, e.g., U.S. Pat. No. 3,562,741 (McEvoy et al.); U.S. Pat. No. 4,430,577 (Bouquet); U.S. Pat. No. 4,845,378 (Garbe et al.); and U.S. Pat. No. 5,150,067 (McMillan).

The processor 121 controls the gated directional coupler 704 to gate the receiver 706 on and thereby detect a return from the resonant network device 110 located in the resonant cavity.

The receiver 706 can detect a return signal from the resonant network device 110 the above-surface signal generation technique, as necessary.

When using the above-surface technique, for example, a delay unit 908 can be configured (e.g., programmed) to a preset delay to control the gating of the receiver 706 for receipt of the feedback pulse. During the gating on of the receiver 706, the ping generated by the resonant network device 110 passes through the gated directional coupler 704 and through a band pass filter 905. The receiver 706 is connected to receive the filtered signal. The receiver 706 can include a phase lock loop (PLL) and feedback circuit (PLL circuit) 708 to lock onto the desired frequency.

The PLL circuit 708 can be implemented through a low pass filter 710 that receives signal from the band pass filter 705. Amplifiers 712 can be connected to receive the filtered output of the low pass filter 710 and provide the amplified signal on its output to an analog-to-digital (A/D) converter 714. The output of the A/D converter 714 is received by a feedback control means 716, such as a proportional-integral-derivative (PID) controller or other programmable logic device as desired. The feedback controller 710 can be configured to calculate a difference between the detected frequency and the desired frequency to determine when the detected frequency is within a desired tolerance. When the detected frequency is within the desired tolerance the feedback controller 716 provides an appropriate output signal to an oscillator 718 so that the PLL circuit 708 can lock onto the detected frequency of the pulse.

Once the PLL circuit 708 locks onto the frequency of the pulse, the processor uses the frequency value as an address in a look-up table to obtain a corresponding temperature value, a pressure value, or other value representing a measurable characteristic of the downhole environment.

Figure 8A:
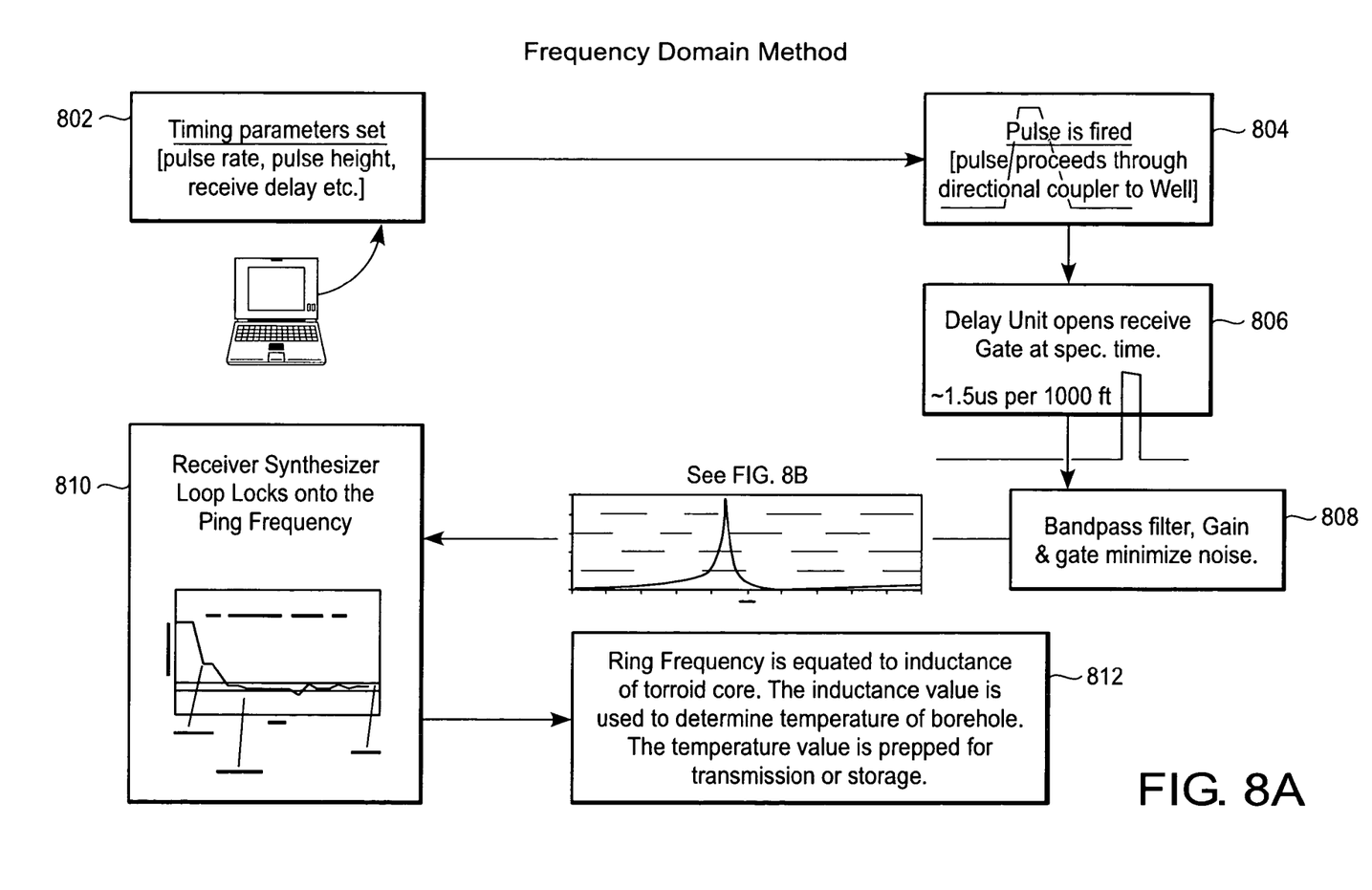
FIG. 8A shows an exemplary method for sensing a characteristic of a borehole through a frequency domain tracking method.

FIG. 8A shows an exemplary method for sensing a characteristic of a borehole using a frequency domain tracking method and an apparatus as described with respect to FIG. 5. In FIG. 8A, at block 802, an operator can set timing parameters as previously discussed with respect to the time domain tracking method of FIG. 6A. A pulse section representing the signal generator 105 of FIG. 1A is provided to transmit an exemplary impulse. This pulse is supplied to a gated directional coupler 804 associated with the probe 106 of FIG. 1A. During an initial pulse, a high sensitivity receiver 505 associated with the signal processor 121 is disabled, and the pulse is applied to the conductive pipe 102. The processor 121 controls the timing of the gated, directional coupler 504 to gate the receiver 505 or when the exemplary impulse is generated by the above-ground signal generator 105.

At block 806, when detecting a reflective signal, a receiving gate is opened to detect the modulated vibration frequency from the resonant network device 110. The receiver filters and amplifies the filtered signal to minimize noise (block 808). The receiver uses a phase lock loop (PLL) and feedback circuit 906 to lock onto the desired frequency (block 810). The PLL circuit 906 enables the processor 121 to lock onto the ringing frequency of the ring pulses generated by the resonant network device 110. The feedback circuit enables the processor 121 to adjust its frequency setting when a pulse is detected, and maintain the set or locked frequency when a pulse is not detected.

When the detected frequency is within a desired tolerance the frequency is locked and used as an address to a numerical value in a look-up table (LUT) (block 812). The numerical value represents an inductance of the torroid core 206 that correlates to the detected frequency in the resonant network device 208. The inductance can be used as an address to another look-up table to determine a temperature or other measurable characteristic of the borehole. In exemplary embodiments, a temperature curve can be used to determine respective temperatures in the borehole based on the inductance of the torroid core 206. In some alternate embodiments, frequency domain tracking can be configured to detect more than one frequency at a time.

The processor 121 uses a detection window that observes 10 to 20 cycles over time. The number of cycles necessary to accurately lock onto a frequency is dependent on the signal-to-noise (S/N) ratio of the detected pulse. The number of cycles is indirectly proportional to the S/N ratio. The pulses are received at a rate of 10 MHz to 100 MHz or lesser or greater as desired. The processor 121 demodulates the received pulses to realize a 12-bit word, which consists of 10 bits of data (2 bits of overhead).

Figure 8B:
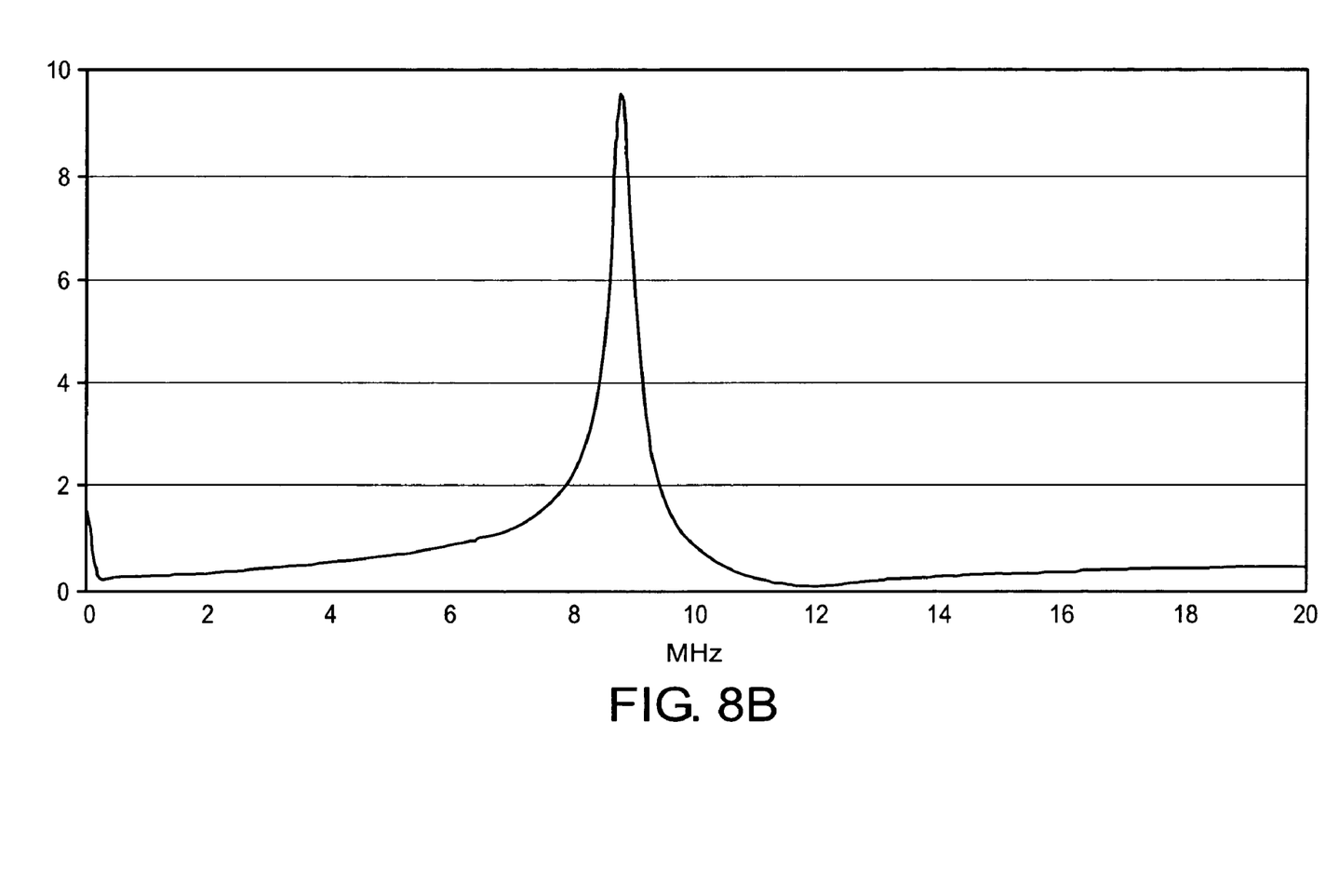
FIG. 8B shows an exemplary plot of a signal detected using the frequency domain tracking method.

FIG. 8B shows an exemplary plot of a detected reflective signal under the frequency domain tracking method.

Numerous additional variations on the above-described embodiments exist. A few such variations are described below.

In some embodiments, the signal can be digitized. Digitation allows processing of the signal using algorithms that can enhance the signal-to-noise (S/N) ratio and can provide a way to single out desired signals from the spurious reflections that can occur from non-sensors.

In some embodiments, a directional wave coupler can be employed to prevent reflections of the signal as it is transmitted between the surface and the downhole sensors. It can happen that undesirable reflections can result from impedance mismatches at connects between cables and devices in the system. Directional wave couplers can minimize such spurious reflections. Such devices are known in the art and are available from electronics supply companies such as Meca Electronics, Inc., Denville, N.J.

In some embodiments, a surface-to-surface relay of the transmitted signal, as it is received at the surface of the well, is performed. e.g., as described in U.S. Pat. No. 6,434,372 to Neagley et al.

In some embodiments, downhole devices (e.g., valves) can be selectively actuated using the electromagnetic energy transmitted from the surface. The energy can be transmitted from the surface in the form of a pulse or in a continuous wave format or other electromagnetic form. The energy is stored over time in a capacitor bank downhole and released when actuation of the valve or other device is called for. Selective discharge of the capacitor bank, and hence, actuation, can be effected with a separate resonant network device designed to ring at a distinct frequency.

Those skilled in the art will appreciate that the disclosed embodiments described herein are by way of example only, and that numerous variations will exist. The invention is limited only by the claims, which encompass the embodiments described herein as well as variants apparent to those skilled in the art.

What we claim is:

1. A method for measuring temperature in a borehole established below a surface of a landform, the method comprising:

directing at least one electromagnetic energy pulse into the borehole to excite at least one downhole transducer that reflects electromagnetic energy at a ring frequency determined by an inductance of the transducer, wherein said transducer comprises an inductive element that is sensitive to temperature, and a capacitive element that is insensitive to temperature;

receiving the reflected energy at a receiver located at the surface of the landform during a predetermined time interval; and processing the received energy using a technique selected from the group consisting of time domain tracking, frequency domain tracking, and combinations thereof, so as to determine a temperature in the borehole based on the inductance of the transducer.

2. The method of claim 1, wherein the directing step comprises transmitting at least one electromagnetic pulse into the borehole.

3. The method of claim 1, wherein the processing step comprises:

extracting the ring frequency from the received energy;

correlating the ring frequency to an inductance of the transducer; and associating the inductance with a temperature in the borehole.

4. The method of claim 1, wherein when the processing is carried out using time domain tracking, the predetermined time interval is synchronized based on a depth-determined delay of the reflected energy pulse.

5. The method of claim 4, wherein the receiving step comprises controlling a gating of the receiver based on a delay preset.

6. The method of claim 1, wherein when the processing step is carried out using frequency domain tracking, the receiving step involves locking onto the ring frequency of the reflected energy.

7. The method of claim 6, wherein the processing step comprises addressing a look-up table based on a value of the locked ring frequency to determine a temperature value.

8. The method of claim 1, wherein there are multiple downhole transducers, and wherein each downhole transducer reflects energy at a different ring frequency.

9. The method of claim 1, wherein a directional wave coupler is employed to minimize reflections of the electromagnetic energy as it travels through the borehole.

10. The method of claim 1, further comprising a step of relaying the reflected energy from the receiver to another receiver located some distance away.

11. A system for measuring temperature in a borehole established below a surface of a landform based on electromagnetic energy pulses reflected at a resonant frequency from at least one downhole transducer to the surface of the landform, the downhole transducer comprising a temperature sensitive inductive element and a temperature insensitive capacitive element, and the system comprising:

a means for receiving the reflected energy pulse at the surface during a predetermined time interval; and a means for processing the received energy to extract the resonant frequency using a technique selected from the group consisting of time domain tracking, frequency domain tracking, and combinations thereof, so as to determine a temperature in the borehole based on an inductive element of the downhole transducer, which is correlated to the extracted resonant frequency.

12. The system of claim 11, further comprising means for controlling a gating of the receiving means based on a depth-determined delay of the reflected energy pulse.

13. The system of claim 11, wherein the receiving means comprises means for locking onto the resonant frequency of the reflected energy pulse when the resonant frequency is within a threshold.

14. The system of claim 11, further comprising a directional wave coupler to minimize reflections of the electromagnetic energy as it travels through the borehole.

15. An apparatus for measuring temperature in a well established in a landform, wherein the well includes a resonant cavity for resonating electromagnetic energy pulses transmitted into the well, and a transducer that reflects the electromagnetic energy pulses to a surface of the well at the resonant frequency, the transducer comprising a temperature sensitive inductive element and a temperature insensitive capacitive element, and the apparatus comprising:

a means for receiving the energy pulses reflected from the transducer; and a means for processing the received energy using a technique selected from the group consisting of time domain tracking, frequency domain tracking, and combinations thereof, so as to extract the resonant frequency of the transducer and determine a temperature in the well based on an inductance of the transducer, the inductance being correlated to the extracted resonant frequency.

* * * * *